(12) United States Patent
Burgess (10) Patent No.: US 6,916,248 B1
(45) Date of Patent: Jul. 12, 2005

(54) FLEXIBLE COUPLING

(75) Inventor: Daniel E. Burgess, Portland, CT (US)

(73) Assignee: PS Technology, Inc., Cromwell, CT (US)

( * ) Notice: Subject to any disclaimer, the term of this patent is extended or adjusted under 35 U.S.C. 154(b) by 233 days.

(21) Appl. No.: 10/062,118

(22) Filed: Jan. 31, 2002

(51) Int. Cl.[7] .............................................. E21B 17/02
(52) U.S. Cl. .......................... 464/20; 464/18; 464/89; 285/52; 285/92; 285/291.1; 285/292.1; 285/355
(58) Field of Search ................................ 285/333, 334, 285/355, 350, 52, 53, 54, 92, 291.1, 292.1; 411/366.1, 277, 426, 258, 930; 464/18, 19, 20, 89; 175/107

(56) References Cited

U.S. PATENT DOCUMENTS

| | | | | |
|---|---|---|---|---|
| 105,290 A | * | 7/1870 | Allison | 285/334 |
| 929,027 A | * | 7/1909 | Schuhmann | 285/333 |
| 1,876,565 A | * | 9/1932 | Buckwalter | 403/334 |
| 2,065,932 A | * | 12/1936 | Black | 285/86 |
| 2,296,198 A | * | 9/1942 | Boynton | 285/91 |
| 2,423,762 A | * | 7/1947 | Everett | 604/241 |
| 2,783,809 A | * | 3/1957 | Haines | 403/47 |
| 3,022,197 A | * | 2/1962 | Jedlicka | 411/258 |
| 3,083,767 A | * | 4/1963 | Brown | 166/377 |
| 3,175,850 A | * | 3/1965 | Steczynski | 285/333 |
| 3,683,989 A | * | 8/1972 | Follstaedt et al. | 411/277 |
| 3,895,829 A | * | 7/1975 | Manson, Jr. | 285/3 |
| 5,007,490 A | | 4/1991 | Ide | |
| 5,007,491 A | | 4/1991 | Ide | |
| 5,098,435 A | * | 3/1992 | Stednitz et al. | 606/73 |
| 5,135,060 A | | 8/1992 | Ide | |
| 5,188,402 A | * | 2/1993 | Colgate et al. | 285/332 |
| 5,252,016 A | * | 10/1993 | Schmid et al. | 411/386 |
| 5,447,472 A | | 9/1995 | Ide | |
| 5,528,951 A | * | 6/1996 | Takahashi et al. | 74/441 |
| 5,833,541 A | | 11/1998 | Turner et al. | |
| 5,882,162 A | * | 3/1999 | Kaneko | 411/411 |
| 5,991,998 A | * | 11/1999 | Kaneko | 29/432.2 |
| 6,123,561 A | | 9/2000 | Turner et al. | |
| 6,165,149 A | * | 12/2000 | Utterberg et al. | 604/5.01 |
| 6,196,598 B1 | * | 3/2001 | Yao | 285/333 |
| 6,276,884 B1 | * | 8/2001 | Bueter | 411/369 |
| 6,361,083 B1 | * | 3/2002 | Riesselmann et al. | 285/333 |
| 6,391,058 B1 | * | 5/2002 | Kuslich et al. | 623/17.11 |

OTHER PUBLICATIONS

APS Technology, High Torque Flexible Coupling, "Principle of Operation", 1 page.
APS Technology, APS Products MWD suspensions, *Suspension Rev*, 1997, 1, 1 page.

* cited by examiner

*Primary Examiner*—James M. Hewitt
(74) *Attorney, Agent, or Firm*—Woodcock Washburn LLP (57) ABSTRACT

Flexible couplings are provided comprising a male member disposed within a female member in a spaced apart configuration, with the space being filled, at least partially, with an elastically deformable material. The male and female members comprise features that prevent separation from one another after the elastically deformable material is provided in the space between them. For example, the male and female members of one embodiment each comprise a threaded region, with the respective male and female threads being intermeshed but generally spaced apart from each other. At least one of the male and female threads is tapered in two opposing directions with respect to a coupling centerline. The double taper requires the elastically deformable material to be displaced for the male and female members to become separated. However, the elastically deformable materials are constrained by surfaces of the male and female members, and therefore, cannot be displaced.

32 Claims, 9 Drawing Sheets

FLEXIBLE COUPLING

FIELD OF THE INVENTION

The present invention relates to flexible couplings that include a male member fitted within a female member, and a layer of elastically deformable material positioned between adjacent portions of the male and female members. The flexible couplings are suitable for transmitting torque, as well as, for attenuating vibrations and applied stresses. Flexible couplings of the present invention are particularly suited for use in the down hole drilling industry, such as, for interconnecting a plurality of drill pipe sections, and for isolating electronic components within a drill pipe section to reduce the potential damaging transmission of shock pulses from an end-connected drill bit.

BACKGROUND OF THE INVENTION

Flexible couplings for connecting one component to another component are well known. One identified use for flexible couplings is for connecting a drive source, such as a motor, to a peripheral device, in which the components are susceptible to initial misalignment, or due to the nature of the components, are dynamically misaligned in use.

Another identified use for flexible couplings is for reducing the transmission of stress and vibrations between two or more connected components. For example, drilling assemblies used by the oil and gas industry, for retrieving various fluids and gases buried within earth formations, typical comprise a drilling string connected to a drill bit. The drilling string comprises a plurality of interconnected pipe segments with the drill bit positioned at a distal end thereof. As the drill bit cuts through the earth, vibrations, usually at high frequencies, occur and are transmitted along the drilling string. These high frequency vibrations may cause fatigue, deterioration, and finally failure of the components of the drilling assembly. In addition, drill string sections may comprise highly sensitive electronic devices, such as those associated with MWD (Measuring While Drilling) systems. The electronics must be isolated from the same high frequency vibrations, as well as, other applied stresses. Furthermore, the electronic devices must be isolated from torsional loads that occur during acceleration or deceleration of the section carrying the electronics.

Figure 1:
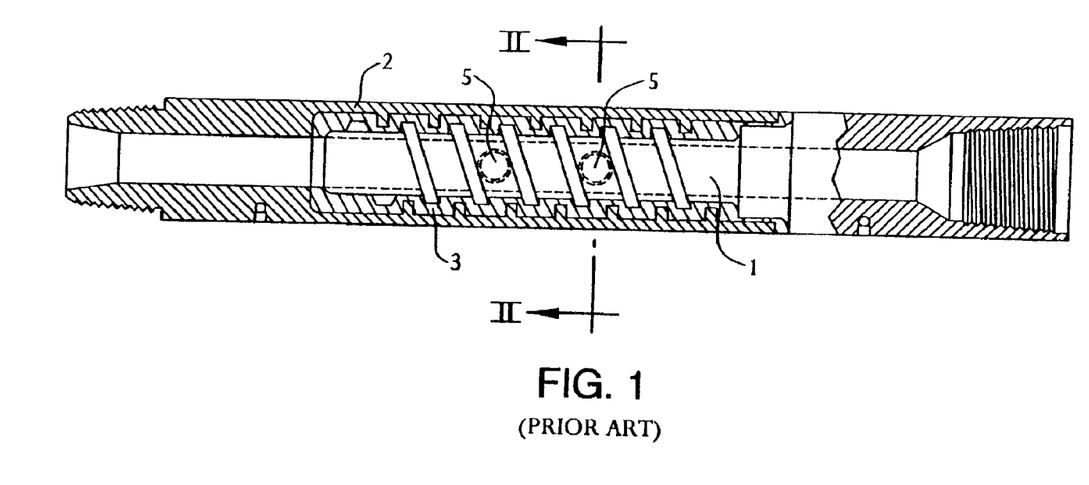
FIG. 1 is a cross-sectional view of a prior art flexible coupling comprising interlocked male and female members having an elastomeric layer therebetween.
Figure 2:
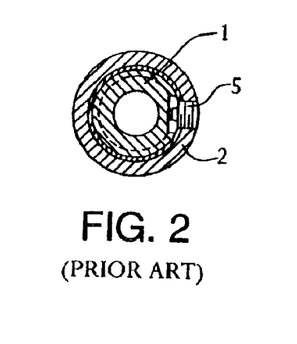
FIG. 2 is transverse cross-section of the coupling shown in FIG. 1, taken along line II—II.

William Turner and Russell Ide, in U.S. Pat. No. 5,833,541 ("the '541 patent"), describe an elastomeric coupling for suppressing shocks and vibrations associated with down hole drilling assemblies. As can be seen in FIGS. 1–2, the coupling includes an interlocked male member 1 and female member 2, each member having threaded portions, and an elastomer 3 filling the spaces between the threaded portions. Under loading the male and female members are capable of moving relative to one another. The inventors of the '541 patent disclose a method of preserving coupling integrity under a "loosening" torque, comprising a plurality of locking plugs The plugs 5 are inserted into the assemblies after the male portion is threaded into the female portion, but before the elastomer is provided The locking plugs extend through a wall of the female member 2 and between adjacent thread turns extending from an outer surface of the male member 1. This arrangement substantially prevents the male threaded portion from being unscrewed from the female threaded portion.

Although a useful contribution to the arts, the coupling integrity preserving method described in the '541 patent has some disadvantages. The locking plugs are prone to failure due to stress concentrating on the plugs. After the plugs fail, the male and female members can decouple upon the presence a sufficient reverse torque. Moreover, it is extremely difficult to properly position the plugs such that they are functional, yet do not act as a stress/vibration transmission conduit, which will occur if any portion of the plug contacts the male member.

Accordingly, a need exists in the art for a flexible coupling that once assembled, will not decouple in any direction due to torsional loads, can effectively attenuate vibrations and other applied stresses, and/or can effectively transmit torque.

SUMMARY OF THE INVENTION

The present invention provides an improved flexible coupling useful for numerous applications, including, but not limited to, transmitting torque, suspending electronic components from apparatuses carrying the same, and reducing the transmission of vibrations and other applied stresses from interconnected components.

In accordance with a preferred embodiment of the present invention, there has now been provided a flexible coupling for use in rotatable devices, the flexible coupling comprising a female member and a male member disposed therein. Each of the female member and the male member comprises a threaded region. A male thread is formed on a male member external surface, and a female thread is formed on a female member internal surface. At least one of the threads is tapered in two opposing directions with respect to a coupling centerline. The female thread and the male thread are intermeshed but generally spaced apart from each other. A layer of elastically deformable material is disposed in the space between the female and male threads.

In accordance with additional preferred embodiments of the present invention, there has now been provided flexible couplings similar to that described above for interconnecting sections of drill piper, and for suspending a component within a drill pipe section.

In accordance with yet another preferred embodiment of the present invention, there has now been provided a flexible coupling for coupling a drill pipe section to a complementary device. The flexible coupling comprises a female member including a first end an opposing second end, and a male member disposed within the female member. A space exists between an outer diameter of the male member and an inner diameter of the female member. A layer of elastically deformable material is disposed within at least a portion of the space between the female and male members. The male member outer diameter changes size at least twice along the portion of the male member disposed within the female member.

In accordance with yet another preferred embodiment of the present invention, there has now been provided a flexible coupling for use in rotatable devices including down hole drilling assemblies. The flexible coupling comprises a female member comprising a closed end, an opposing open end, and an inner diameter. A male member comprising an outer diameter is disposed within the female member such that there is a space between the male member outer diameter and the female member inner diameter. A layer of elastically deformable material disposed within at least a portion of the space between the female and male members. The space at a position proximate the open end is greater than the space at a position proximate the closed end.

BRIEF DESCRIPTION OF THE DRAWINGS

The present invention is believed to be best understood through the following detailed description of the preferred embodiments and the accompanying drawings herein like reference numerals indicate like features, and wherein:

FIG. 9b is a partial cross-sectional view of the assembled male and female members shown in FIG. 9a;

DETAILED DESCRIPTION OF THE PREFERRED EMBODIMENTS

Figure 3:
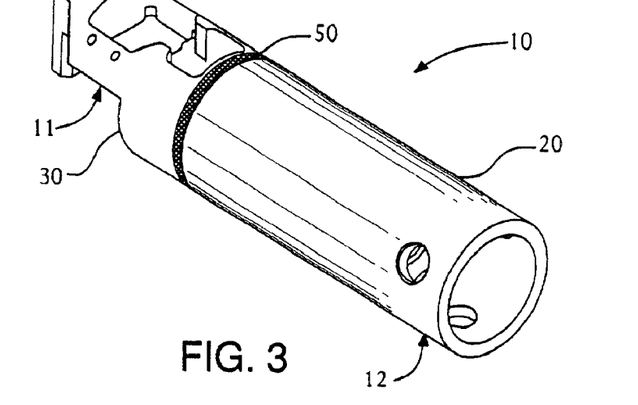
FIG. 3 is a perspective view of a flexible coupling embodiment provided by the present invention.
Figure 4:
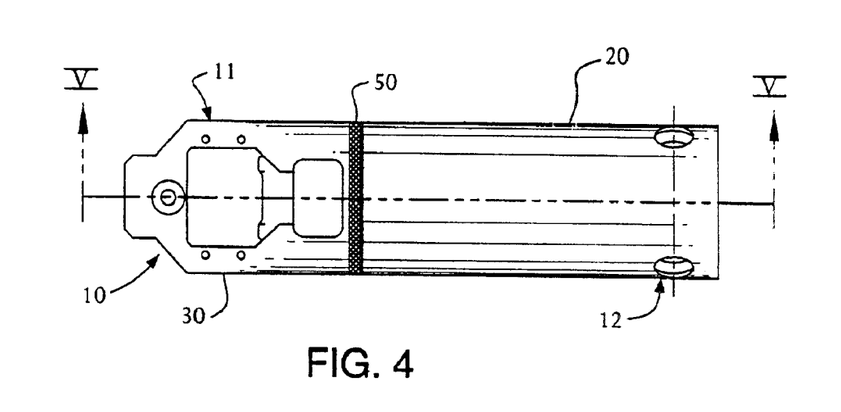
FIG. 4 is a side view of the flexible coupling shown in FIG. 3.
Figure 5:
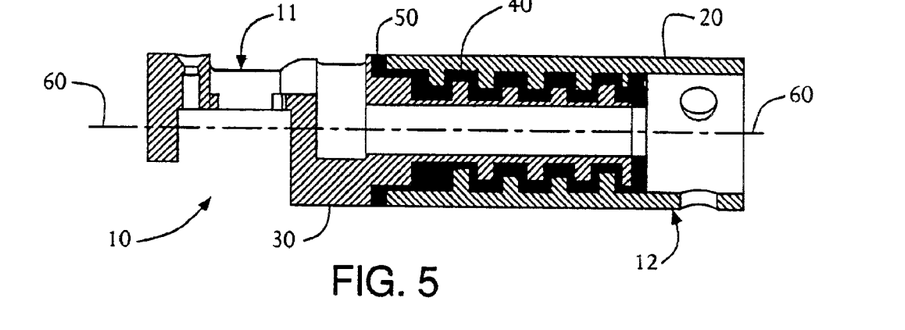
FIG. 5 is a cross-sectional view of the flexible coupling shown in FIG. 4, taken along line V—V.

Referring now to the drawings, wherein like reference numerals designate corresponding structure throughout the views, and referring in particular to FIGS. 3 to 5, a flexible coupling 10 in the form of a suspension system is provided, comprising a first end region 12, an opposing second end region 11, and a female member 20 and a male member 30 aligned along a coupling centerline 60. A portion of male member 30 is disposed within female member 20 in a spaced apart configuration, thereby defining a space 40. An elastically deformable material 50 is provided within space 40. Under loading, the female and male members are capable of moving relative to each other due to the presence of elastically deformable material 50.

Figure 6:
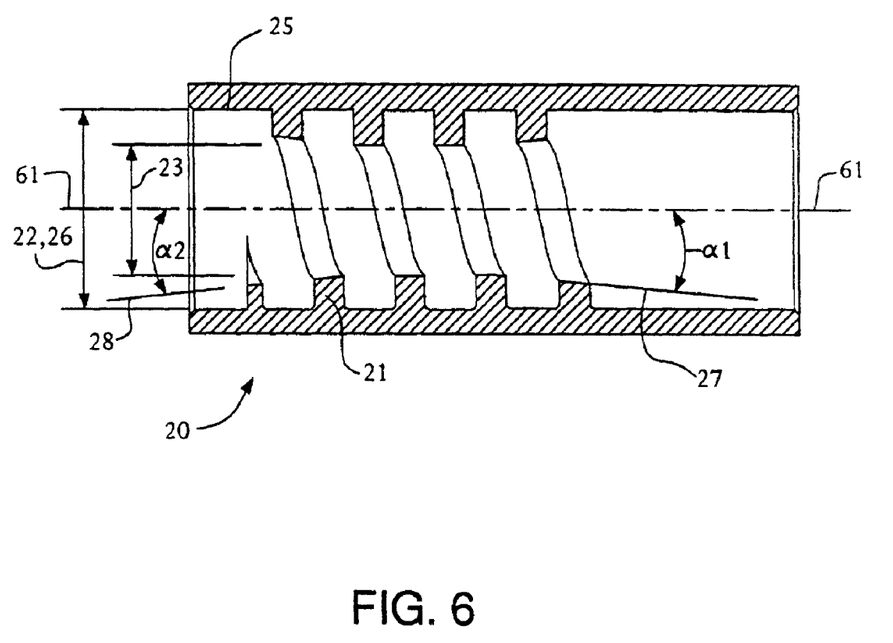
FIG. 6 is a cross-sectional view of a female member embodiment provided by the present invention.
Figure 7:
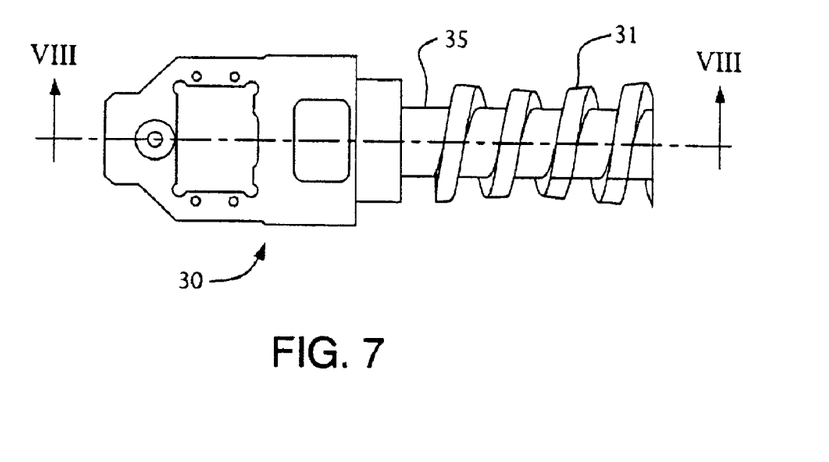
FIG. 7 is a side view of a male member embodiment provided by the present invention.
Figure 8:
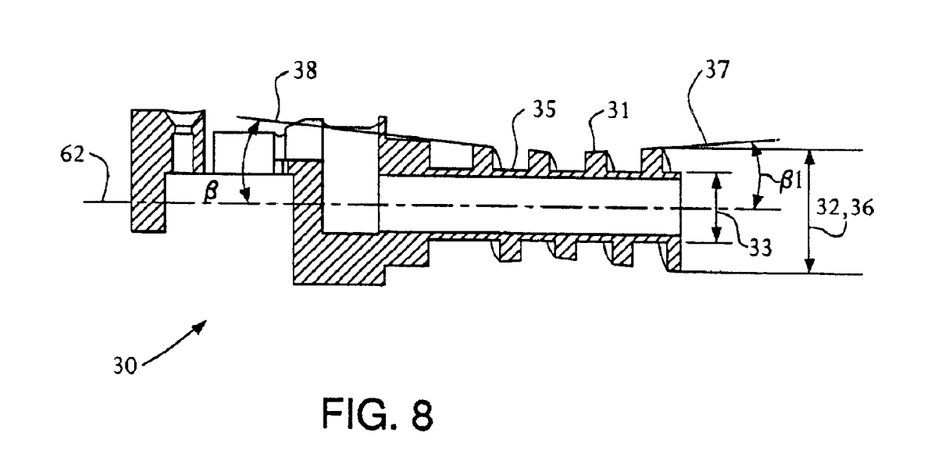
FIG. 8 is a cross-sectional view of the male member shown in FIG. 7, taken along line VIII—VIII.

As can be seen most clearly in FIGS. 6–8, female member 20 and male member 30 each have a helically projecting thread extending from one of its surfaces. A female thread 21 extends from a female member inner surface 25, and has a thread major diameter 22 and a thread minor diameter 23. In the embodiments illustrated in the figures, female thread major diameter 22 corresponds with a female member inner diameter 26. In similar fashion, a male thread 31 extends from a male member external surface 35, and has a thread major diameter 32 and a thread minor diameter 33. The major diameter 32 of the male thread corresponds with a male member outer diameter 36.

In preferred embodiments of the present invention, the female and male members 20, 30 are constructed from steel, although other materials, such as, for example, aluminum, ceramics, polymers, and composites may be used. For embodiments comprising threaded regions, thread milling, single point milling and turning, and EDM (electric discharge machine) techniques can used to form the male and female threads 31, 21. Preferably, the male and female threads are integrally formed through investment casting of the female and male members.

Preferred embodiments of the present invention include the beneficial feature that after the elastically deformable material 50 is provided within space 40, the female and male members are prevented from separating. One manner of providing this feature is by employing a double taper on at least one of the female thread 21 and the male thread 31, wherein the two tapers extend in opposing directions. In preferred embodiments, and as shown in the figures, both the female and male threads are tapered in two opposing directions.

Female member 20 has a double-tapered female thread 21. Specifically, the double taper is employed on the female thread minor diameter 23, while the female thread major diameter 22 is constant. A first taper 27 is defined by a first taper angle $\alpha 1$ and an opposing second taper 28 is defined by a second taper angle $\alpha 2$ (measured from female member centerline 61). The taper angles are preferably from about 1 degree to about 45 degrees, and more preferably from about 5 to about 10 degrees.

Male member 30 employs a corresponding double taper on its thread major diameter 32. A first taper 37 is defined by a first taper angle $\beta 1$ and an opposing second taper 38 is defined by a second taper angle $\beta 2$ (measured from male member centerline 62). Taper angles 37 and 38 are preferably similar in dimension to that of the corresponding female thread tapers 27, 28.

Figure 9A:
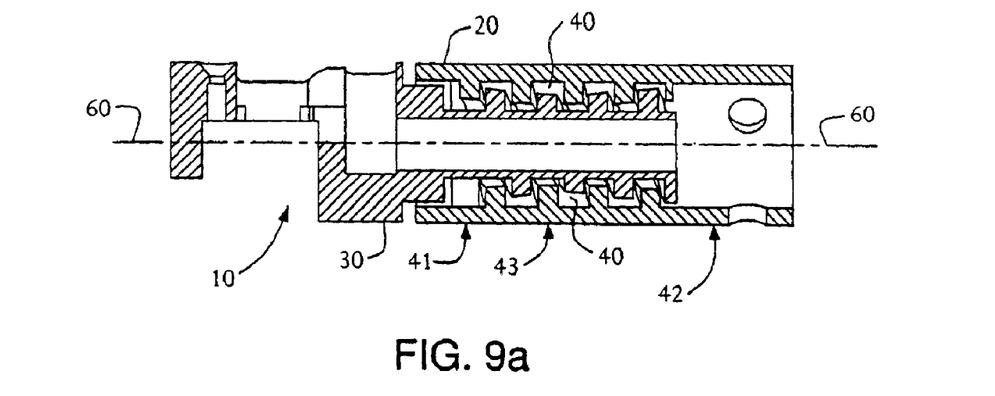
FIG. 9a is a cross-sectional view of assembled male and female members provided by the present invention, the male and female members comprising double-tapered threads in a back-to-back configuration.
Figure 9B:
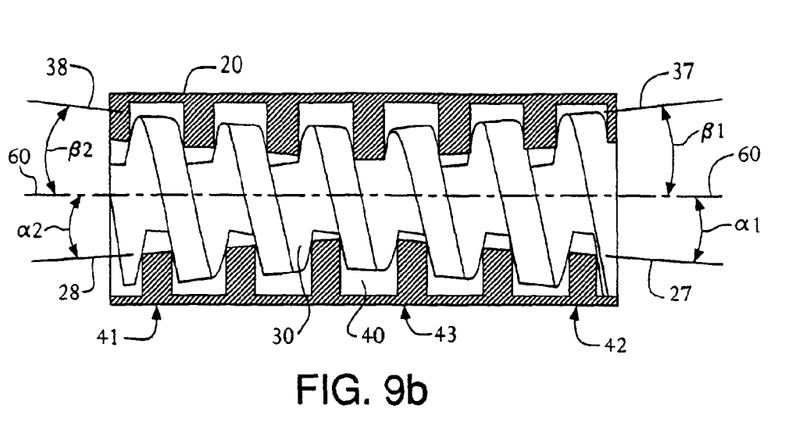
Figure 10:
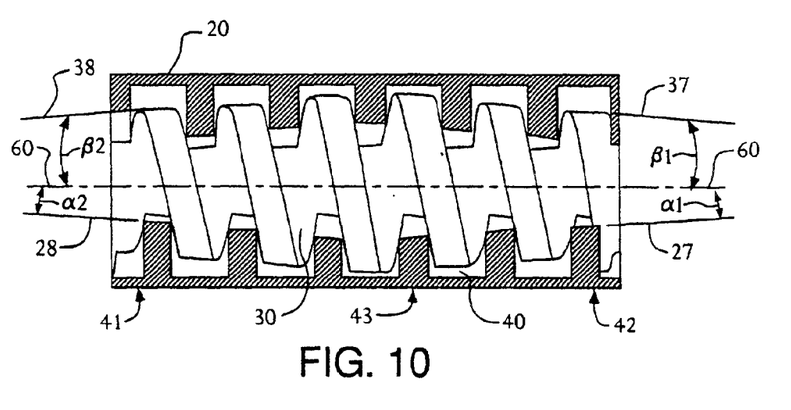
FIG. 10 is a partial cross-sectional view of assembled male and female members comprising double-tapered threads in a face-to-face configuration.

FIGS. 9a and 9b illustrates the male member embodiment 30 shown in FIGS. 6 and 7, disposed within the female member embodiment 20 shown in FIG. 8. The intermeshed (overlapped) female and male threads 21, 31 define a first end region 42 and an opposing second end region 41. Both the first and second tapers 27, 28 on the female member 20 and the first and second tapers 37, 38 on the male member 30 are inwardly directed, with respect to coupling centerline 60, from positions proximate the first and second regions 42, 41 and toward a central region 43. This particular arrangement provides a "back-to-back" double-taper configuration. Several different configuration embodiments are possible by altering the placement of the first and second tapers; that is, on the thread major or minor diameter, by altering the orientation of the tapers (inward or outward); and by altering the position and extension length of the two tapers. In addition to the preferred configuration shown in FIGS. 9a and 9b, a second preferred configuration is shown in FIG. 10. Here the first and second tapers on the male and female members are outwardly directed from end regions toward a central region. This configuration is referred to as "face-to-face." The face-to-face configuration is relatively more flexible as compared to the back-to-back configuration shown in FIGS. 9a and 9b.

Figure 11:
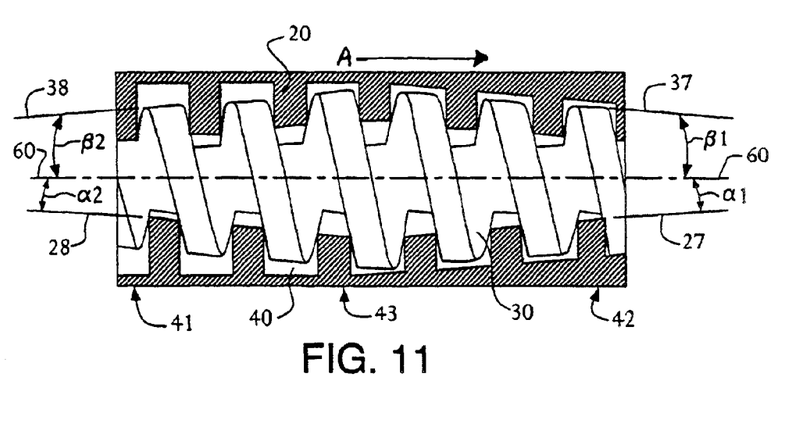
FIG. 11 is a partial cross-sectional view of assembled male and female members comprising a modified face-to-face configuration.

Referring now to FIG. 11, a third preferred configuration is illustrated, which is a variation of the face-to-face configuration shown in FIG. 10. The variation includes tapering the female thread major diameter 22 along a portion of the female member 20. This modified face-to-face configuration permits assembly of the male and female members in one direction only, but a thinner layer of elastically deformable material provided in the taper-to-taper interface portion allows for higher values of torque to be transmitted in the direction of assembly (shown with an arrow and reference character A).

Figure 12:
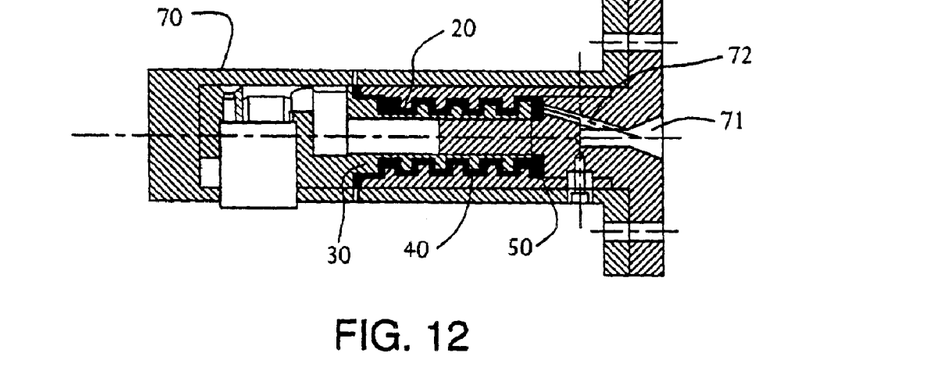
FIG. 12 is a cross-sectional view of assembled male and female members residing in an injection mold, and having elastically deformable material injected into a space between the male and female members.

The flexible couplings of the present invention are made by first assembling male and female members in a spaced apart arrangement, and then providing elastically deformable material within the defined space. FIGS. 9 to 11 show assembled male and female members prior to adding the elastically deformable material. Preferably, the elastically deformable material is injection molded into the space between the male and female members. As can be seen in FIG. 12, the assembled members are placed into a mold 70, and elastically deformable material 50 is injected through a sprue 71, down a runner 72 and into space 40.

In preferred embodiments the elastically deformable material is an elastomer, such as, for example, natural and synthetic rubber, such as Nitrile rubber, styrene rubber, VITON®, butyl rubber, and polysiloxanes; silicone; and polyurethane. Other suitable materials, which may or may not be classified as elastomers, include neoprene; cork; TEFLON®; epoxy, ceramic; metal, such as, for example, sintered and pourable metals; and the like. The type of elastically deformable material used in the present invention will depend on several factors, some of which include the characteristics of the vibrations and other stresses the flexible coupling will likely experience, and the environment the flexible coupling is exposed to. Environmental concerns include temperature, the existence of moisture, and the existence of corroding chemicals, among others. By way of example, inexpensive polyurethanes may be used in low temperature applications. Relatively soft materials such as silicone are suitable where low frequency vibrations are anticipated. VITON®, having a durometer hardness value in the range from about 50 to about 90, is a useful elastically deformable material, as it provides effective vibration and stress damping, has good chemical resistance, and is suitable for high temperature applications.

Figure 13:
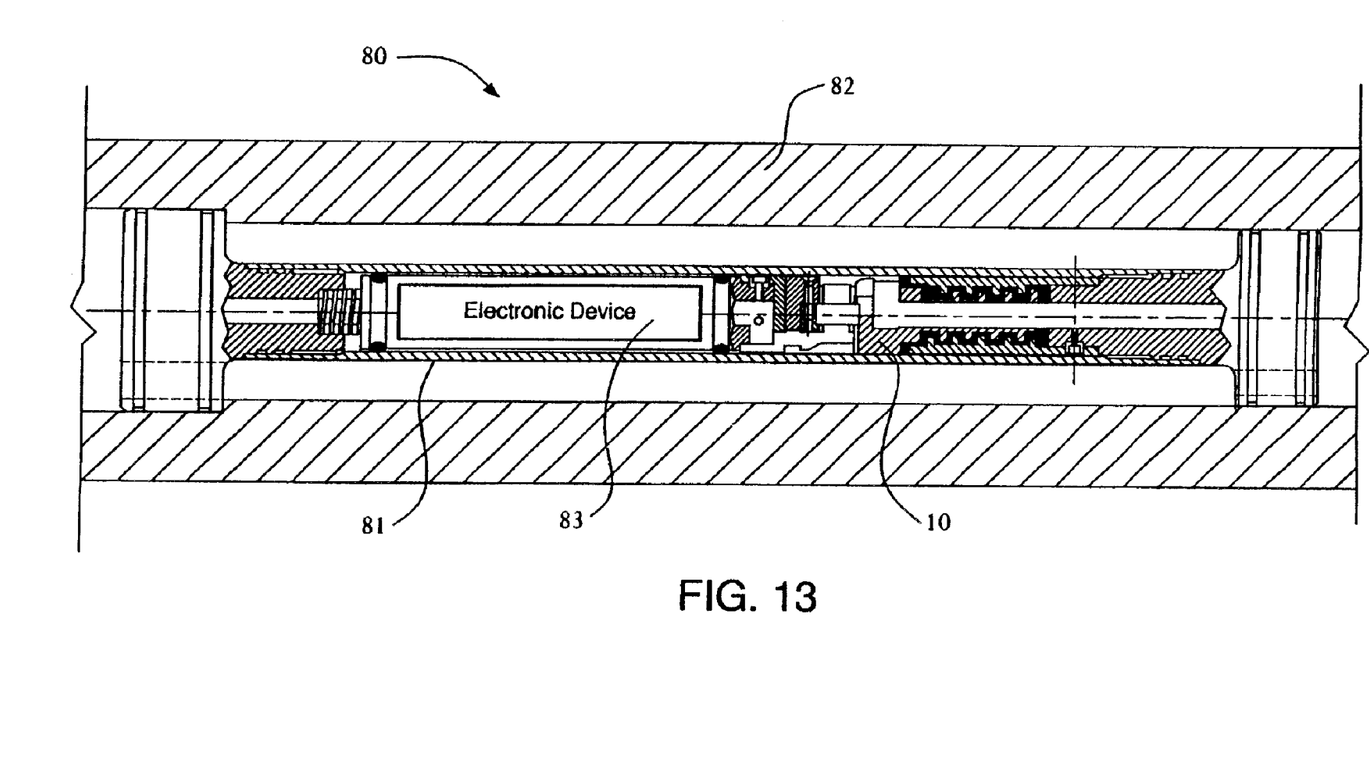
FIG. 13 is a partial cross-sectional view of a drill string section comprising a flexible coupling in the form of a suspension system according to the present invention.

The flexible couplings shown in FIGS. 3 to 11 are in the form of a suspension system, which is particularly useful in the drilling industry for suspending sensitive electronics within a drill string section. To illustrate this application, and with reference to FIG. 13, a drill string section 80 is depicted comprising a pressure tube 81 mounted within a drill pipe 82. Pressure tube 81 houses an electronic device 83 that is suspended by flexible coupling 10.

Figure 14:
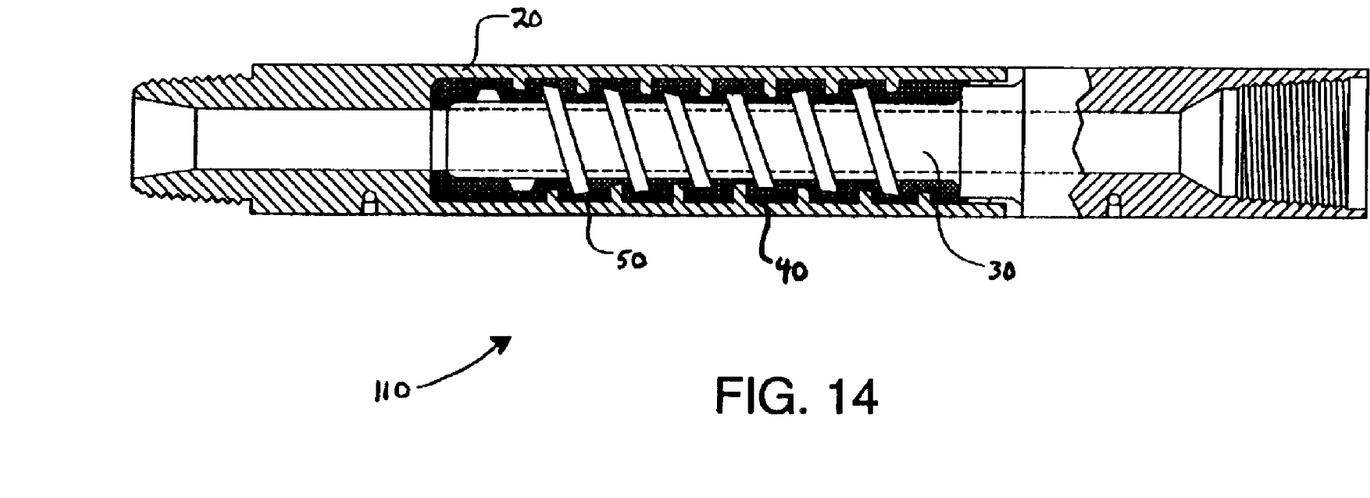
FIG. 14 is cross-sectional view of a flexible coupling embodiment provided by the present invention, comprising end portions for connecting a first component to a second component.

It should be appreciated, that the flexible couplings of the present invention are useful for numerous other applications beyond that of a suspension system. Flexible coupling 110, shown in FIG. 14, is generally adapted for connecting a first component to a second component. Thus, flexible coupling 110 can be used to interconnect two sections of drill pipe in a drill string, such that shocks and vibrations are suppressed, while torque is appropriately transmitted to an attached drill bit.

Flexible coupling 110 is also useful for connecting components that are misaligned. For example, electric motors for driving rolling units in a steel mill are typically slightly misaligned. The flexible couplings of the present invention can be used between the electric motors and rolling units to prevent damaging strain on the motor, and to utilize the motor's power efficiently.

Figure 15:
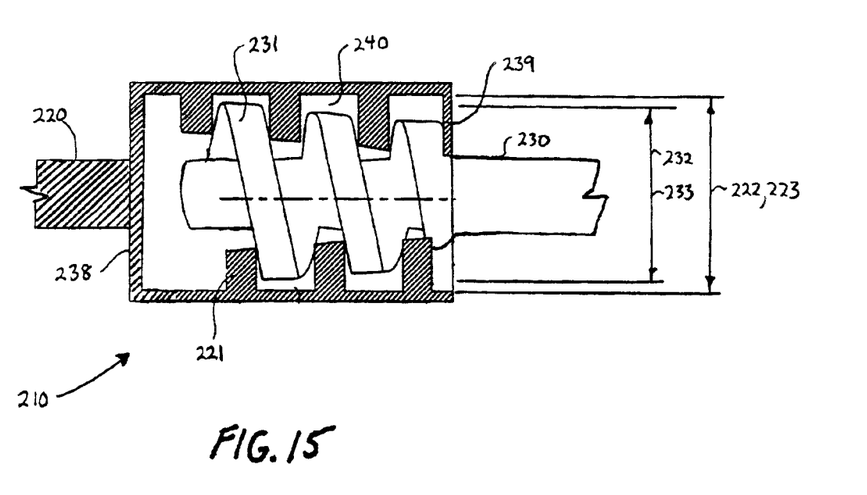
FIG. 15 is a partial cross-sectional view of assembled male and female members, wherein the female member comprises a closed end and an open end.

Referring now to FIG. 15, another flexible coupling embodiment 210 is shown comprising a female member 220 including a closed end 238 and an opposing open end 239. A male member 230 is disposed within female member 220 in a spaced apart configuration, thereby defining space 240. The female and male members each have a thread 221 and 231, respectively, formed on a surface thereof. Female thread 221 has a major diameter 222 that corresponds to a female member inner diameter 223. Similarly, male thread 231 has a major diameter 232 that corresponds to a male member outer diameter 233. Female thread 221 and male thread 231 are tapered in opposing directions, such that the space 240 proximate open end 239 is greater than the space proximate closed end 238. Upon filling space 240 with an elastically deformable material, the female and male members are prevented from becoming separated from each other.

Although all of the accompanying figures depict the male and female members as having threaded regions, the present invention also contemplates non-threaded male and female members. In these non-threaded embodiments, at least one of a male member outer diameter 36, 233 and the female member inner diameter 26, 223 comprise features, such as, for example, a groove; or have a geometry, such as, for example, a saddle-shape or a diamond-shape, whereby the space between the assembled female and male members and the elastically deformable material provided therein prevents separation of the female and male members.

It is to be understood that even though numerous characteristics and advantages of the present invention have been set forth in the foregoing description, together with details of the structure and function of the invention, the disclosure is illustrative only. Accordingly, changes may be made in detail, especially in matters of shape, size and arrangement of features within the principles of the invention to the full extent indicated by the broad general meaning of the terms in which the appended claims are expressed.

What is claimed is:

1. A flexible coupling for use in a rotatable device, the flexible coupling comprising:

a female member comprising an internal surface including a female thread formed thereon;

a male member comprising an external surface including a male thread formed thereon, at least a portion of the male member is disposed within the female member such that the female thread and the male thread are intermeshed but generally spaced apart from each other; and     a layer of elastically deformable material disposed in the space between the female and male threads;

wherein at least one of the female thread and the male thread is tapered in two opposing directions with respect to a coupling centerline.

2. The flexible coupling according to claim 1, wherein the male and female threads each have a major diameter and a minor diameter, and wherein at least one of the female thread minor diameter and the male thread major diameter is tapered in two opposing directions with respect to the coupling centerline.

3. The flexible coupling according to claim 2, wherein both the female thread minor diameter and the male thread major diameter are tapered in two opposing directions with respect to the coupling centerline.

4. The flexible coupling according to claim 1, wherein the elastically deformable material is an elastomer.

5. The flexible coupling according to claim 1, wherein the rotatable device comprises a drill pipe section.

6. The flexible coupling according to claim 5, wherein the flexible coupling is located inside the drill pipe section and forms at least part of an electronics suspension system.

7. The flexible coupling according to claim 5, wherein the flexible coupling is adapted for interconnecting a plurality of drill pipe sections.

8. The flexible coupling according to claim 1, wherein the intermeshed female and male threads have a first end region and an opposing second end region, and at least one of the female thread and the male thread is double-tapered, comprising:
   a first taper extending from a position proximate the first end region and toward the second end region, the first taper being defined by a first taper angle with respect to the coupling centerline; and
   a second taper extending from a position proximate the second end region and toward the first end region, the second taper being defined by a second taper angle with respect to the coupling centerline.

9. The flexible coupling according to claim 8, wherein both the female thread and the male thread are double-tapered.

10. The flexible coupling according to claim 8, wherein the first taper and the second taper are inwardly directed with respect to the coupling centerline, from positions proximate the first and second end regions respectively.

11. The flexible coupling according to claim 8, wherein the first taper and the second taper are outwardly directed with respect to the coupling centerline, from positions proximate the first and second end regions respectively.

12. The flexible coupling according to claim 8, wherein the first and second taper angles are from about 1 degree to about 45 degrees.

13. The flexible coupling according to claim 8, wherein the first and second taper angles are from about 5 degrees to about 10 degrees.

14. The flexible coupling according to claim 8, wherein the first taper angle and the second taper angle are equally dimensioned.

15. The flexible coupling according to claim 8, wherein the male and female threads each have a major diameter and a minor diameter, and wherein at least one of the female thread minor diameter and the male thread major diameter is double-tapered.

16. The flexible coupling according to claim 15, wherein both the female thread minor diameter and the male thread major diameter are double-tapered.

17. The flexible coupling according to claim 15, wherein both the female thread major diameter and the male thread minor diameter are constant.

18. The flexible coupling according to claim 15, wherein one portion of the female thread major diameter is constant and another portion of the female thread major diameter is tapered.

19. A flexible coupling for interconnecting sections of drill pipe, the flexible coupling comprising:
   a female member comprising an internal surface including a female thread formed thereon;
   a male member comprising an external surface including a male thread formed thereon, at least a portion of the male member is disposed within the female member such that the female thread and the male thread are intermeshed but generally spaced apart from each other; and
   a layer of elastically deformable material disposed in the space between the female and male threads;
   wherein at least one of the female thread and the male thread is tapered in two opposing directions with respect to a coupling centerline.

20. A flexible coupling for suspending a component within a drill pipe section, the flexible coupling comprising:
   a female member comprising an internal surface including a female thread formed thereon;
   a male member comprising an external surface including a male thread formed thereon, at least a portion of the male member is disposed within the female member such that the female thread and the male thread are intermeshed but generally spaced apart from each other; and
   a layer of elastically deformable material disposed in the space between the female and male threads;
   wherein at least one of the female thread and the male thread is tapered in two opposing directions with respect to a coupling centerline.

21. A flexible coupling for coupling a drill pipe section to a complementary device, the flexible coupling comprising:
   a female member comprising an inner diameter, and opposing first and second ends;
   a male member comprising an outer diameter, at least a portion of the male member being disposed within the female member such that there is a space between the male member outer diameter and the female member inner diameter; and
   a layer of elastically deformable material disposed within at least a portion of the space;
   wherein the male member outer diameter changes size at least twice along the portion of the male member disposed within the female member, and wherein the complementary device is an electronic device.

22. The flexible coupling according to claim 21, wherein overlapping portions of the female and male members define opposing first and second end regions, and wherein the space is a different size at locations proximal the first and second end region than at locations distal the first and second end regions.

23. The flexible coupling according to claim 22, wherein the space is larger at locations proximal the first and second end regions than at locations distal the first and second end regions.

24. The flexible coupling according to claim 22, wherein the space is smaller at locations proximal the first and second end regions than a locations distal the first and second end regions.

25. The flexible coupling according to claim 21, wherein the male member comprises a threaded region including a male thread formed on an external surface thereof, the male thread having a major diameter and a minor diameter, and wherein the male member outer diameter is defined by the male thread major diameter.

26. The flexible coupling according to claim 25, wherein the male thread major diameter is double-tapered.

27. The flexible coupling according to claim 25, wherein the female member comprises a threaded region including a female thread formed on an internal surface thereof, the female thread having a major diameter and a minor diameter, and wherein the female member inner diameter is defined by the female thread major diameter.

28. A flexible coupling comprising:
a female member comprising a closed end, an opposing open end, and an inner diameter;
a male member comprising an outer diameter, at least a portion of the male member being disposed within the female member such that there is a space between the male member outer diameter and the female member inner diameter; and
a layer of elastically deformable material disposed within at least a portion of the space;
wherein the space, in the absence of the layer of elastically deformable material, at a position proximate the open end is greater than the space at a position proximate the closed end.

29. The flexible coupling according to claim 28, wherein the female member comprises a female thread formed on an inner surface thereof and the male member comprises a male thread formed on an external surface thereof, and wherein the female thread and the male thread are tapered in opposing directions.

30. A flexible coupling for coupling a drill pipe section to a complementary device, the flexible coupling comprising:
a female member comprising an inner diameter, and opposing first and second ends;
a male member comprising an outer diameter, at least a portion of the male member being disposed within the female member such that there is a space between the male member outer diameter and the female member inner diameter; and
a layer of elastically deformable material disposed within at least a portion of the space;
wherein the male member outer diameter changes size at least twice along the portion of the male member disposed within the female member and
wherein a decrease in diameter of the male member outer diameter is followed by an increase in diameter along the portion of the male member disposed within the female member.

31. A flexible coupling for coupling a drill pipe section to a complementary device, the flexible coupling comprising:
a female member comprising an inner diameter, and opposing first and second ends;
a male member comprising an outer diameter, at least a portion of the male member being disposed within the female member such that there is a space between the male member outer diameter and the female member inner diameter; and
a layer of elastically deformable material disposed within at least a portion of the space;
wherein the male member outer diameter changes size at least twice along the portion of the male member disposed within the female member and
wherein an increase in diameter of the male member outer diameter is followed by a decrease in diameter along the portion of the male member disposed within the female member.

32. A flexible coupling for coupling a drill pipe section to a complementary device, the flexible coupling comprising:
a female member comprising an inner diameter, and opposing first and second ends;
a male member comprising an outer diameter, at least a portion of the male member being disposed within the female member such that there is a space between the male member outer diameter and the female member inner diameter; and
a layer of elastically deformable material disposed within at least a portion of the space;
wherein the male member outer diameter changes size at least twice along the portion of the male member disposed within the female member, and wherein the complementary device is an adjacent drill pipe section.

* * * * *

UNITED STATES PATENT AND TRADEMARK OFFICE
CERTIFICATE OF CORRECTION

PATENT NO. : 6,916,248 B1
DATED : July 12, 2005
INVENTOR(S) : Daniel E. Burgess

It is certified that error appears in the above-identified patent and that said Letters Patent is hereby corrected as shown below:

Title page,
Item [73], Assignee, please delete "PS Technology, Inc.," and insert -- APS Technology, Inc., -- therefor.

Column 1,
Line 57, please delete "plugs The" and insert -- plugs 5. The -- therefor.
Line 59, please delete "provided The" and insert -- provided. The -- therefor.

Column 3,
Line 1, please delete "herein" and insert -- wherein -- therefor.
Line 9, after "invention;" "FIG. 4 is a" should begin a new paragraph.

Column 8,
Line 52, please delete "than a locations" and insert -- than at locations -- therefor.

Signed and Sealed this

Eleventh Day of October, 2005

JON W. DUDAS
*Director of the United States Patent and Trademark Office*